United States Patent
Chew et al.

(10) Patent No.: US 12,361,024 B2
(45) Date of Patent: Jul. 15, 2025

(54) SYSTEM AND METHOD FOR SELF-ADAPTIVE AND AUTONOMOUS SHARDING OF DISTRIBUTED LEDGER TECHNOLOGY PLATFORMS

(71) Applicant: QPQ LTD, Dublin (IE)

(72) Inventors: Greg Chew, Dublin (IE); Emanuele Ragnoli, Dublin (IE); Gokhan Sagirlar, Dublin (IE)

(73) Assignee: QPQ LTD, Dublin (IE)

(*) Notice: Subject to any disclaimer, the term of this patent is extended or adjusted under 35 U.S.C. 154(b) by 0 days.

(21) Appl. No.: 18/250,138

(22) PCT Filed: Oct. 22, 2020

(86) PCT No.: PCT/EP2020/079794
§ 371 (c)(1),
(2) Date: Apr. 21, 2023

(87) PCT Pub. No.: WO2022/083871
PCT Pub. Date: Apr. 28, 2022

(65) Prior Publication Data
US 2023/0401234 A1 Dec. 14, 2023

(51) Int. Cl.
*G06F 16/20* (2019.01)
*G06F 16/18* (2019.01)
(Continued)

(52) U.S. Cl.
CPC ........ *G06F 16/278* (2019.01); *G06F 16/1865* (2019.01); *G06F 16/217* (2019.01); *G06Q 20/00* (2013.01)

(58) Field of Classification Search
CPC ............... G06F 16/1865; G06F 16/217; G06F 16/278; H04L 67/10; H04L 67/1008; H04L 67/104; H04L 67/1097; G06Q 20/00
See application file for complete search history.

(56) References Cited

U.S. PATENT DOCUMENTS

| | | | |
|---|---|---|---|
| 2014/0100901 A1* | 4/2014 | Haine | G06F 40/186 705/7.11 |
| 2015/0046123 A1* | 2/2015 | Kato | G06F 11/079 702/183 |

(Continued)

FOREIGN PATENT DOCUMENTS

GB 2577118 A 3/2020

OTHER PUBLICATIONS

Wang Gang Gang Wang@Uconn Edu et al: "Sok Sharding on Blockchain", Proceedings of the 1st ACM Conference on Advances in Financial Technologies, ACMPUB27, New York, NY, USA, Oct. 21, 2019 (Oct. 21, 2019), pp. 41-61, XP058480745.

(Continued)

*Primary Examiner* — Diedra McQuitery
(74) *Attorney, Agent, or Firm* — Foley & Lardner LLP

(57) ABSTRACT

The present disclosure provides a self-adaptive sharding engine, SASE, which is configured to dynamically adapt the configuration of connected DLT platforms to ensure that their operational performance is maintained within target levels. The SASE is provided with a decision and optimisation, DO, module that is configured to receive and process a set of configuration parameters obtained from a sensor module to determine a set of corresponding performance metrics indicative of the operational performance of the target DLT platform. The DO module is configured to compare the values of the performance metrics with corresponding target values. Accordingly, when at least one of the performance metrics is within a value range from at least one corresponding target value, the DO module is configured to adjust an aspect of the DLT configuration of the DLT platform to optimise its operational performance.

31 Claims, 6 Drawing Sheets

(51) Int. Cl.
*G06F 16/21* (2019.01)
*G06F 16/27* (2019.01)
*G06Q 20/00* (2012.01)

(56) References Cited

U.S. PATENT DOCUMENTS

| | | | |
|---|---|---|---|
| 2018/0300382 A1 | 10/2018 | Madisetti | |
| 2018/0341930 A1* | 11/2018 | Moir | G06Q 20/3827 |
| 2019/0312800 A1* | 10/2019 | Schibler | H04L 41/0869 |
| 2020/0252404 A1* | 8/2020 | Padmanabhan | H04L 63/061 |
| 2021/0173670 A1* | 6/2021 | Borra | G06F 11/3466 |

OTHER PUBLICATIONS

International Search Report and Written Opinion issued in the PCT Application No. PCT/EP2020/079794.

\* cited by examiner

SYSTEM AND METHOD FOR SELF-ADAPTIVE AND AUTONOMOUS SHARDING OF DISTRIBUTED LEDGER TECHNOLOGY PLATFORMS

CROSS-REFERENCE TO RELATED APPLICATIONS

This application claims the benefit of priority to International Application No. PCT/EP2020/079794, filed on Oct. 22, 2020, which is incorporated by reference in its entirety.

FIELD

The present invention relates to a distributed ledger technology (DLT) sharding engine that is configured to manage and optimise the operation of connected DLT platforms so that their corresponding performance metrics are maintained within a target performance value.

BACKGROUND

Distributed ledger technology (DLT) platforms have revolutionized the way distributed transactions between multiple systems are recorded and verified. DLT platforms are widely known for their use in decentralised networks for recording transactions between multiple systems. The fundamental concept of a DLT platform can be used in a range of new system applications that go beyond the cryptocurrency domain, such as to secure, record and verify transactions between different systems in a centralised and/or decentralised distributed network. However, as the number of transactions handled by a DLT platform grows so does the ledger storage and processing requirements, thereby significantly impacting the scalability of the platform, resulting in a system that is slower, more expensive and less sustainable over the long term.

Sharding was first introduced in database management systems to alleviate scalability issues faced by systems executing an high number of transactions. Similar to databases, current DLT platforms face the same problem and, as such, sharding has been introduced as a way of alleviating the scalability issue encountered by current DLT platforms. In essence, sharding refers to the process of partitioning the DLT platform ledger into smaller data blocks, referred herein as shards, which are distributed over a network of transaction processing nodes. Each shard is configured to receive a number of transactions, which are processed by a local network of transaction processing nodes. As such, each shard may be viewed by an external system as an independent ledger within the DLT platform. Sharding enables transactions submitted to different shards to be executed in parallel, thereby significantly improving scalability.

However, current approaches to sharding have certain limitations. As previously indicated, each shard is viewed by the connected systems and applications as an independent ledger rather as a segment of a much larger ledger. Therefore, communication between shards can be difficult to establish and would require a special communication mechanism to be built that would be applicable only to particular DLT platform architecture. However, even with such a communication mechanism, inter-shard communication can lead to an undesirable increase in the system resources overhead. Furthermore, over time the sharding configuration may need to be adapted based on the performance of the transaction processing nodes and the transaction workload, which would require a significant re-development effort of all communication mechanisms. Moreover, sharding may undermine the security and validity of transactions compared to a non-sharding DLT platform architecture. In general, with a traditional DLT platform, the users are able to download and process the entire transaction history of a DLT platform, while in a sharding configuration users may be limited only to the transaction history handled by the specific shard. As a result, a malicious user may take advantage of a sharding configuration to manipulate and control the data handled by a shard (e.g. in a double spend scenario). Furthermore, there are currently in existence many different DLT platforms, each having different configurations. Therefore, a sharding configuration that may apply to one DLT platform, may not be suitable for another. As such, it becomes difficult to manage and optimise the sharding configuration for different DLT platforms such that they operate according their target performance metrics.

Therefore, there is a need to provide a solution that alleviates at least some of the above problems associated with sharding of DLT platforms.

SUMMARY OF THE INVENTION

The aim of the present disclosure is to provide a sharding engine for managing and optimising the sharding configuration of various types of DLT platforms.

Another aim of the present disclosure is to provide a sharding engine which is DLT platform agnostic.

A further aim of the present disclosure is to provide a sharding engine that is capable of managing and validating inter-shard transactions between a plurality of shards.

These and other aims of the present disclosure are achieved with the sharding engine system and a method for sharding showing the technical characteristics of the independent claims. Advantageous embodiments are presented in the dependent claims.

According to embodiments, the sharding engine of the present disclosure is configured to adjust the configuration of the DLT platform based on the monitoring of a set of performances metrics. As such, the sharding engine may dynamically adapt the configuration of the DLT platform based on the operational performance of the connected DLT platform, thus operating in a self-adaptive and autonomous manner. A Decision and Optimisation (DO) module may be provided, which is configured to determine the performance metrics based on performance data obtained from the DLT platform using a sensor monitoring module. The sensor monitoring module may monitor a set of performance parameters of the DLT platform e.g. number of transactions handled by each DLT share, the performance of each transaction processing node in the local networks, and the like. The data associated with the performance metrics are communicated to the DO module, where the data is processed to determine the operational performance of the DLT platform based on the values of the performance metrics. For example, the DO module may compare the values of the performance metrics with corresponding target values to determine whether the operational performance of the DLT platform is within a target range. In the case, where one or more of the performance metrics are within a value range from the corresponding target values, the DO module may perform adjustments to the configuration of the connected DLT platform to ensure that performance metrics are brought to the required target levels. For example, if one or more of the performance metrics are close to a threshold value, then the DO module may determine a set of configuration adjustments to be performed on the connected DLT platform. The performance metrics may be associated with different aspects of the DLT platform such the volume of transactions processed, the time taken for the transaction processing nodes to reach consensus, the operation of each transaction processing node, the partition configuration of the DLT platform, and the like. As such, the DO module may determine a set of configuration adjustments to be made to the DLT platform to ensure that the performance metrics are maintained within their corresponding target values. Therefore, the sharding engine of the present disclosure may be considered as a self-aware and context-aware platform, which collects data that reflect the operational performance of the DLT shards e.g. throughput of processed transactions, transaction execution latency, and the like, and overall operation of the DLT platform e.g. number of transaction requests, network latency among transaction processing nodes of the shards, and the like, and accordingly decides how to react to reflect changes in the operation and performance of in the individual DLT shards' states and the DLT platform. As such, the sharding engine of the present disclosure may operate in a dynamic manner that monitors, reacts and adapts the target DLT platform architecture to changes occurring inside the DLT shards and in DLT platform operating environment e.g. performance, network metrics and their statistical expressions, number of transaction requests, status of the shards that are currently performing operations, and the like.

According to embodiments, the sharding engine of the present disclosure is configured to ensure ordering and consensus on events processed by each DLT shard at a global level. The ordering and consensus are achieved by enabling local transaction processing nodes of each DLT shard to participate in the global network of transaction processing nodes, thus enabling the consensus and ordering of inter-shard transactions processed in the overall SASE system. Enabling selected nodes from all shards to participate in the processing of inter-shard transactions ensures decentralization of the overall system level consensus.

According to embodiments, the sharding engine of the present disclosure is configured to abstract the data structure of the target DLT platforms to a common data structure. More specifically, the sharding engine is provided with an Intermediate Graph Representation (IGR) module that is configured to convert the data structure of a DLT platform to an IGR data structure, and a Higher Graph Representation (HGR) module that aggregates IGR and HGR data structures into a HGR data structure. As such the sharding engine of the present disclosure is DLT agnostic and may be applied to various types of DLT platforms.

BRIEF DESCRIPTION OF THE DRAWINGS

The following drawings are provided as an example to explain further and describe various aspects of the invention.

DETAILED DESCRIPTION

Figure 1:
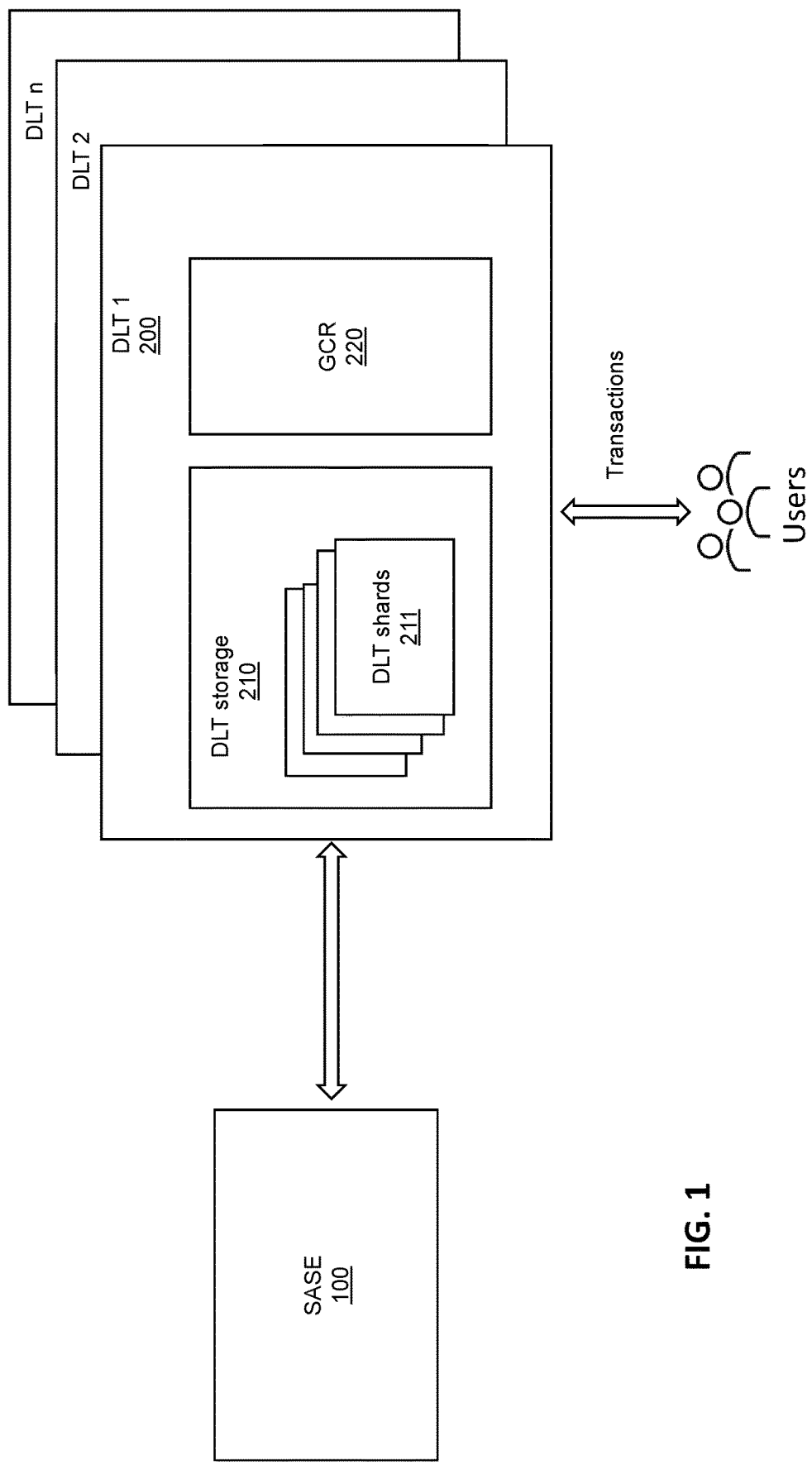
FIG. 1 shows an example of a sharding engine connected to a plurality of DLT platforms according to embodiments of the present invention.

The present invention will be illustrated using the exemplified embodiments shown in the FIGS. 1 to 6 which will be described in more detail below. It should be noted that any references made to dimensions are only indicative and do not restrict the present disclosure in any way. While this disclosure has been shown and described with reference to certain illustrated embodiments thereof, it will be understood by those skilled in the art that various changes in form and details may be made therein without departing from the scope of the invention encompassed by the appended claims. FIG. 1 shows an example of a sharding engine 100, referred to hereinafter as a self-adaptive sharding engine (SASE), communicatively coupled with a plurality of DLT platforms 200 in accordance with embodiments of the present invention. The SASE 100 is configured to monitor and optimise the performance of one or more communicatively coupled distributed ledger technology, DLT, platforms 200 based on a set of performance metrics extracted from each DLT platform 200. According to embodiments of the present disclosure, the DLT platform 200 may comprise a DLT storage module 210, which may be partitioned into one or more shards 211 according to a DLT configuration. Each DLT shard 211 may be associated with a local network of transaction processing nodes, referred to as Local Committee Members (LCM), configured to process and verify submitted DLT transactions according to a local consensus protocol defined by a Global Conflict Resolver, GCR, module 220 in accordance with the DLT configuration. The GCR module 220 may be considered as a global consensus and ordering module that provides algorithms to reach consensus on the processed transactions. The GCR module 220 may comprise a set of consensus algorithms and libraries defined according to the target DLT e.g. Proof-of-Stake, traditional Byzantine-Fault-Tolerant protocols, and the like.

In the context of the present disclosure, consensus protocols refer to a set of predefined processes used by transaction processing nodes to keep the processing and history of processed DLT transactions consistent across the DLT platform. In SASE system of the present disclosure, it is assumed that access to the DLTs is controlled and that transaction processing nodes are invited to participate in the transaction processing. The participating transaction processing nodes or parties take part in the consensus protocol by processing and voting on the submitted DLT transactions based on the predefined consensus protocol processes.

In the context of the present disclosure, the term sharding refers to a partitioning operation performed in data processing and storage platforms into smaller units.

In the context of the present disclosure, the term self-adaptive, refers to a closed-loop system with a feedback loop that receives values from parameters extracted during operation, and accordingly adjust its configuration to reflect changes detected during operation. These changes may stem from the system's self-state e.g. internal causes of changes to the system such as failure, or context e.g. external events such as increasing requests from users. A self-adaptive system is configured to monitor itself and its context, detect significant changes, decide how to react, and act to execute such decisions. As such, the self-adaptive sharding engine 100 of the present disclosure is configured to monitor connected DLT platforms 200 for changes in their operation and context and accordingly adjust their configuration, if required, based on the operational changes and context observed.

In the context of the present disclosure, the term context refers to parameters in the operating environment that affect the system's properties and its behaviour, e.g. as described in Salehie, Mazeiar & Tahvildari, Ladan. (2009). Self-adaptive software: Landscape and research challenges, Journal of Trans. Auton. Adapt. Syst (TAAS).

Therefore, a context-aware system may be considered a system that is configured to gather information about changes in its operating environment or the operating environment of connected systems.

In the context of the present disclosure, the term safety and liveness refer to the consensus protocol properties. The safety property requires that, during the consensus algorithm's execution, no malicious or unexpected transaction would be deemed valid by the transaction processing nodes, but instead would be rejected. The liveliness property requires the consensus algorithm to reach a defined and valid state in a finite or agreed bounded time.

Figure 2:
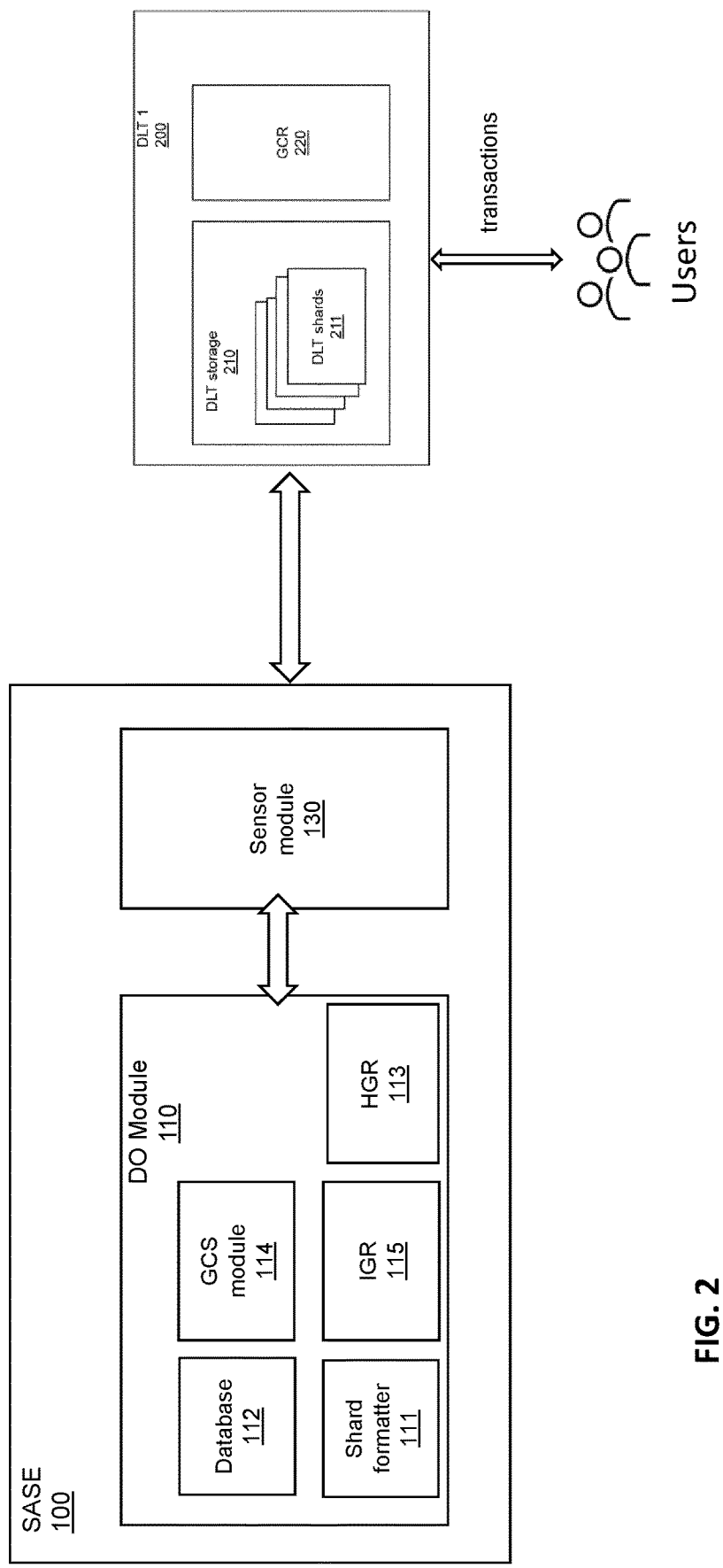
FIGS. 2 and 3 show an example of the architecture of the sharding engine according to embodiments of the present invention.
Figure 3:
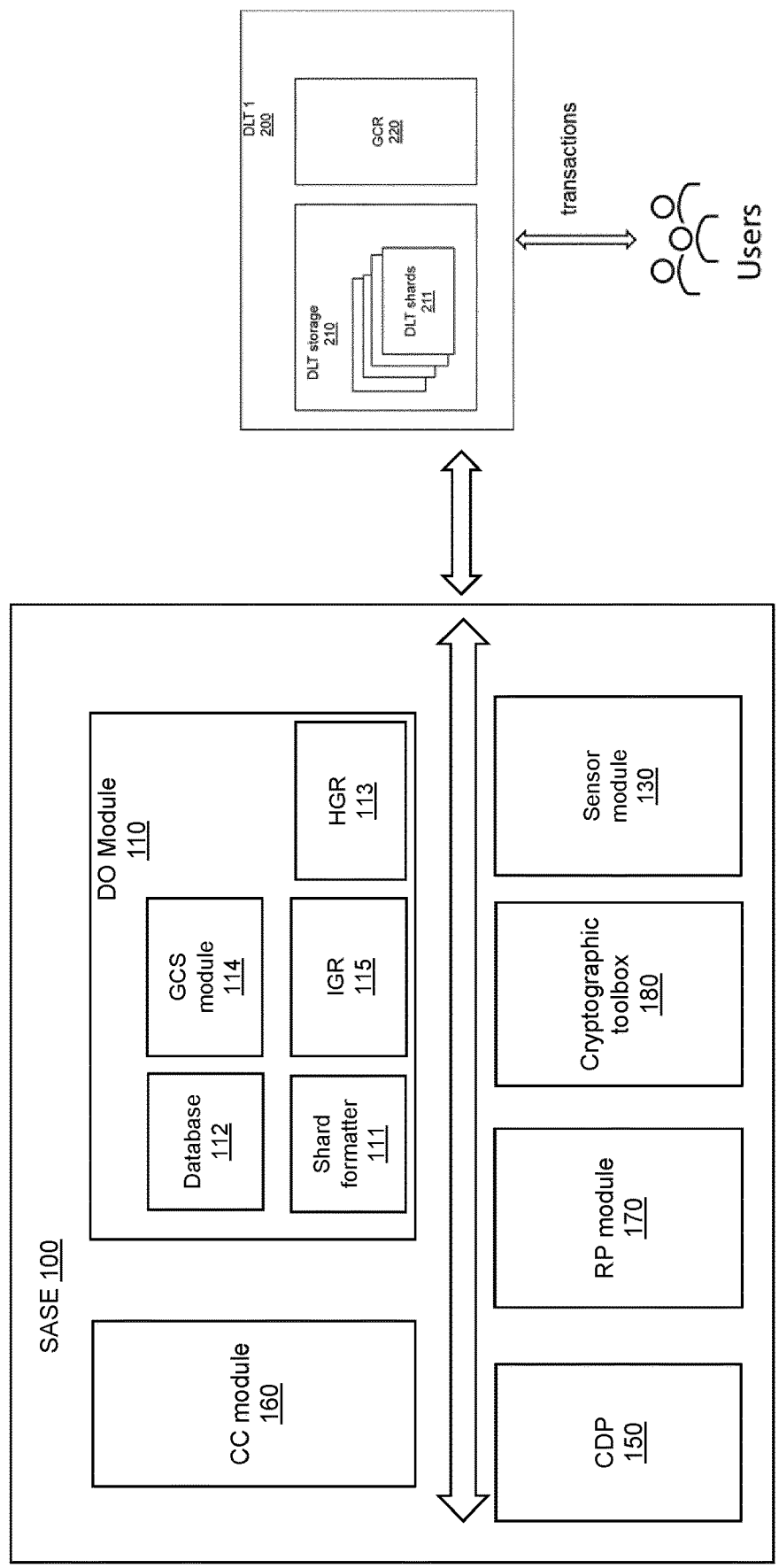

FIGS. 2 and 3 show an example of the architecture of the SASE 100. According to embodiments of the present disclosure, the SASE 100 comprises a sensor module 130 configured to monitor a set of configuration parameters associated with each of the connected DLT platforms 200, and a decision and optimisation, DO, module 110 configured to receive and process the values obtained from the set of configuration parameters to determine a set of corresponding performance metrics indicative of the operational performance of the target DLT platform 200.

The sensor monitoring module 130 may comprise a plurality of sensors that monitor the Dotards 211 in the DLT storage module 210 and the shards operational environment e.g. the target DLT networks of transaction processing nodes. The sensor monitoring module 130 collects data that reflect the state of all shards, e.g. the. system's self-state, and overall SASE's operational environment. The sensor monitoring module 130 is configured to output data to the DO module 110. The sensor data transmitted to the DO module may comprise one or more of:
- data that reflects system's self-state i.e. self-awareness data such as:
  throughput of processed transactions,
  transaction processing latency i.e. how long does it take for a shard to finalize execution of a transaction and reaching consensus on the outcome,
  execution status of transaction processing nodes i.e. to detect inactive nodes,
  status of the consensus process with regards to safety, to detect if a shard takes malicious or invalid decisions on processed transactions, and liveliness, to detect if a shard is not able to finalize consensus process, requirements of consensus algorithm used in shards 211; and
- data that reflects changes in the system's operational environment i.e. context-awareness data, such as:
  number of transaction requests per transaction processing nodes,
  network latency for data sharing between transaction processing nodes,
  network bottlenecks that hinders data transmission across transaction processing nodes
  topological changes of transaction processing node in the network, and the like.

The DO module 110 may be configured to compare the values of the performance metrics derived from the information obtained from the sensor monitoring module 130 with corresponding target values. Based, on the comparison, the DO module 110, is configured, when at least one of the performance metrics is within a value range from at least one corresponding target value, to adjust an aspect of the DLT configuration of the DLT platform to optimise its operational performance.

For example, the DO module 110 may be configured to adjust the DLT configuration based on at least one configuration protocol selected from a configuration protocol database 112, the at least one configuration protocol comprising instructions, which when executed trigger an optimisation of one or more aspects of the DLT platform configuration. The at least one configuration protocol may be selected, based on the operational performance determined for the DLT platform by the DO module 110, from a DLT optimisation matrix comprising a plurality of different DLT operational performance scenarios, each associated with one or more configuration protocols from the database. For example, the DLT optimisation matrix may comprise a list of predefined operational performance scenarios, each associated with one or more configuration protocols. In the case where the detected operational performance is absent from the DLT optimisation matrix, the DO module 110 may be configured to issue a notification to one or more users requesting input for adjusting the DLT configuration and/or selecting a configuration protocol. For example, the user or a connected system may provide a response comprising instructions how the DLT configuration is to be adjusted based on the determined operational performance e.g. a new configuration protocol may be provided. The DO module 110 may be configured to update the DLT optimisation matrix with the detected operation performance, and accordingly associate it with associate the action taken and/or configuration protocol provided by the user and/or connected system.

According to embodiments of the present disclosure, the DO module 110 may be configured to adjust, based on the at least one selected configuration protocol, the DLT storage architecture. For example, the DO module 110 may adjust the DLT storage architecture by adjusting the partitioning configuration of the DLT storage architecture e.g. by adjusting the number and structure of DLT shards involved in the processing of DLT transactions. Furthermore, the DO module 110 may group DLT shards 211 having common shard characteristics such as DLT shards that are involved in inter-shard DLT transactions, DLT shards that process DLT transactions from common geographical region, DLT shards that are associated with a particular application logic, and other common characteristics and parameters. It should also be noted that the DLT shards may be grouped according to user preferences. As such the DO module 110 may be configured, based on the selected at least one configuration protocol, to adjust the DLT storage architecture by splitting the DLT storage architecture into a plurality of hierarchically connected storage layers. For example, the DO module 110, based on the context and operation performance of the DLT shards 211, may reconfigure the DLT storage architecture by generating a local storage layer, which is configured to store in a plurality of local shards the DLT transactions submitted to each of the DLT shards, and a main storage layer comprising one main shard, which is configured to store references to all DLT transactions processed by shards belonging to lower storage layers. Furthermore, the DO module 110, depending on the context of the DLT shards 111, may add one or more intermediate storage layers between the local storage layer and the main storage layer. Each intermediate storage layer being configured to store, in intermediate shards, inter-shard DLT transactions and references to transactions processed by a group of shards belonging to the local storage layer and/or one or more lower hierarchy intermediate storage layers. Each shard, in each of the hierarchical connected storage layers, may be associated with a network of transaction processing nodes for ordering and verifying submitted DLT transactions. DO module 110 may comprise a Global Committee Selection, GCS, module 114 configured to select, based on a set of criterias associated with safety and liveness properties of the consensus algorithm defined in GCR module 220, a set of global transaction processing nodes from the local networks of the DLT shards to participate in the transaction processing networks associated with the shards in each hierarchically connected storage layer. The GCS module 114 may be configured to generate a global network of transaction processing nodes for processing and verifying transactions submitted to the main shard of the main storage layer, and intermediate shards of the intermediate storage layers. The GCS module 114 may be configured to select the global network of transaction processing nodes, also referred to as Global Committee Members (GCM), from the transaction processing nodes of the local network associated with each of the DLT shards 211.

The GCS module 114 may perform LCM and GCM transaction node selection for shards in the different hierarchical levels of the DLT storage module 210, based on data received from the DO module 110 and GCR module 220. The data received may include but not limited to:
information on the set of LCM nodes and execution information of LCM and GCM nodes, which may be provided by the DO module 110,
inputs rules and characteristics of the consensus algorithm used in the DLT platform 200, which may be provided by the GCR module 220.

The GCS module 114, based on the input data received, may generate output data notifying the DO module 110 about the suitability of each transaction processing node in participating as a global committee member. For example, the GSM module 114 may perform the following steps:
if the given node set satisfies the safety and liveness requirements of the consensus algorithm, it outputs GCM node configuration dictionary to DO module,
if it doesn't, GCS module 114 notifies DO module 110 that given node set is not suitable.
The GCS module 114 may be provided with a set of libraries and algorithms, such as:
safety and liveness analytics that measure and infer those metrics,
game theory libraries that select transaction processing nodes based on metrics that satisfy rational behaviours (i.e. based on the acts of TCs in order to promote overall SASE's interests most effectively), fault tolerance libraries that select transaction processing nodes based on strategies that satisfy Byzantine Fault Tolerance (BFT).

As previously discussed, the GCS 114 may perform the following tasks:
the GCS 114, given the execution information on the set of candidate LCM nodes for a shard at a hierarchical level, checks if the available set of transaction processing nodes satisfy the safety and liveness requirements of the consensus algorithm defined by GCR 220 with regards to node execution information e.g. node's behaviour: malicious or honest, performance etc.;
if the given node set satisfies the safety and liveness requirements of the consensus algorithm, GCS 114 selects GCM nodes with regards to node execution information input by DO module, and outputs this information to DO module by populating the GCM dictionary that includes information of the LCM nodes that are selected as GCMs.

As such, the DO module 110 becomes aware of the transaction processing nodes associated with each shard in each of the hierarchical levels of the DLT storage 210

The DO module 110 is configured to generate shards at each of the different hierarchically connected storage layers, based on the data obtained from the sensor monitoring module 130. For example, the shards may be generated based on the DLT transactions submitted to the DLT shards and/or the grouping of the DLT shards. The DO module 110, as shown in FIGS. 2 and 3 may comprise an Intermediate Graph Representation, IGR, module 115 configured to convert the data structure of the DLT transaction data processed by the transaction processing nodes in each of the local shards of the local storage layer into a common IGR data structure, which acts as a common data representation format for various types of DLT platforms 200. The IGR data structure comprises a graph data structure configured to abstract the data structure of a target DLT platform to the common IGR data structure; and an authenticated data structure comprising ordered references to transactions in the graph data structures, so that operations submitted to the DLT platform 200 by untrusted parties are verified by the corresponding networks of transaction processing nodes. In general, the IGR module 115 abstracts target DLT's data structure e.g. blockchain, DAG, and the like, in an Intermediate Graph Representation structure as a common data representation form. The IGR module 115 operates on the input transactions sent by the shard's LCM and GCM nodes and provides the common data form IGR. The IGR data structure may comprise:
a graph data structure that enables the abstraction of the target DLT's data structures in order to have a common representation of transaction data for various types of DLTs; and
an authenticated data structure (i.e. a data structure that allows operations of untrusted parties to be verified by others by cryptographic means) that consists of ordered references to transactions in the graph data structure. An authenticated data structure enables efficient access, verification and ordering of processed events and transactions represented in the graph data structure.
Therefore, the IGR module provides a way to guarantee abstraction of the target DLT's data structures and performance in terms of access, process, verification and ordering.

The DO module 110 may be provided with a Higher Graph Representation, HGR, module 113 configured to receive as input the IGR data structures generated by the IGR module 115 and accordingly convert them into corresponding higher graph representations, HGR, data structures stored at corresponding intermediate shards at one or more intermediate storage layers and/or the main shard of the main storage layer of the DLT storage module 210. Each HGR data structure comprises references to inter-related DLT transactions referenced in a plurality of IGR and/or HGR data structures that are stored at a lower hierarchical storage layer of the DLT storage. The HGR module 113 comprises a graph data structure configured to aggregate multiple graph data structures into a single graph data structure, such that a DLT transaction stored in an HGR graph data structure consists of references to DLT transactions referenced in IGR and/or lower level HGR data structures; and an authenticated data structure comprising ordered references to transactions in the HGR graph data structures so as to ensure correct ordering of the referenced transactions and provide a mapping between HGR and IGR referenced DLT transactions. In general, the HGR module 113 abstracts multiple IGR and $HGR_x$ data structure, in a Higher Graph Representation form with an associated abstraction level index "x". The abstraction level index specifies the abstraction level of the HGRx formed transaction data, where the plurality of $HGR_{x-1}$ formed data can be abstracted to the $HGR_x$ formed data. The $HGR_x$ data form may be provided with:

- a graph data structure that enables aggregation of multiple graph data structures to a single graph data structure. As such, a transaction stored in the $HGR_x$'s graph data structure consists of references to transactions of the input IGRs' graph data structures. This enables abstraction of multiple IGR's or $HGR_{x-1}$'s graph data structures in a $HGR_x$'s graph data structure.
- an authenticated data structure that consists of ordered references to transactions in the HGR's graph data structure. Therefore, HGR ensures correct ordering of the referenced transactions. HGR's authenticated data structure also provides a mapping for HGR transactions and referenced IGR transactions.

Overall, HGR module provides a way to abstract multiple IGR and HGR formed data sources in a HGR formed data source. This gives SASE 100 the ability to represent transactions processed in all shards in a single data abstraction level.

Figure 4:
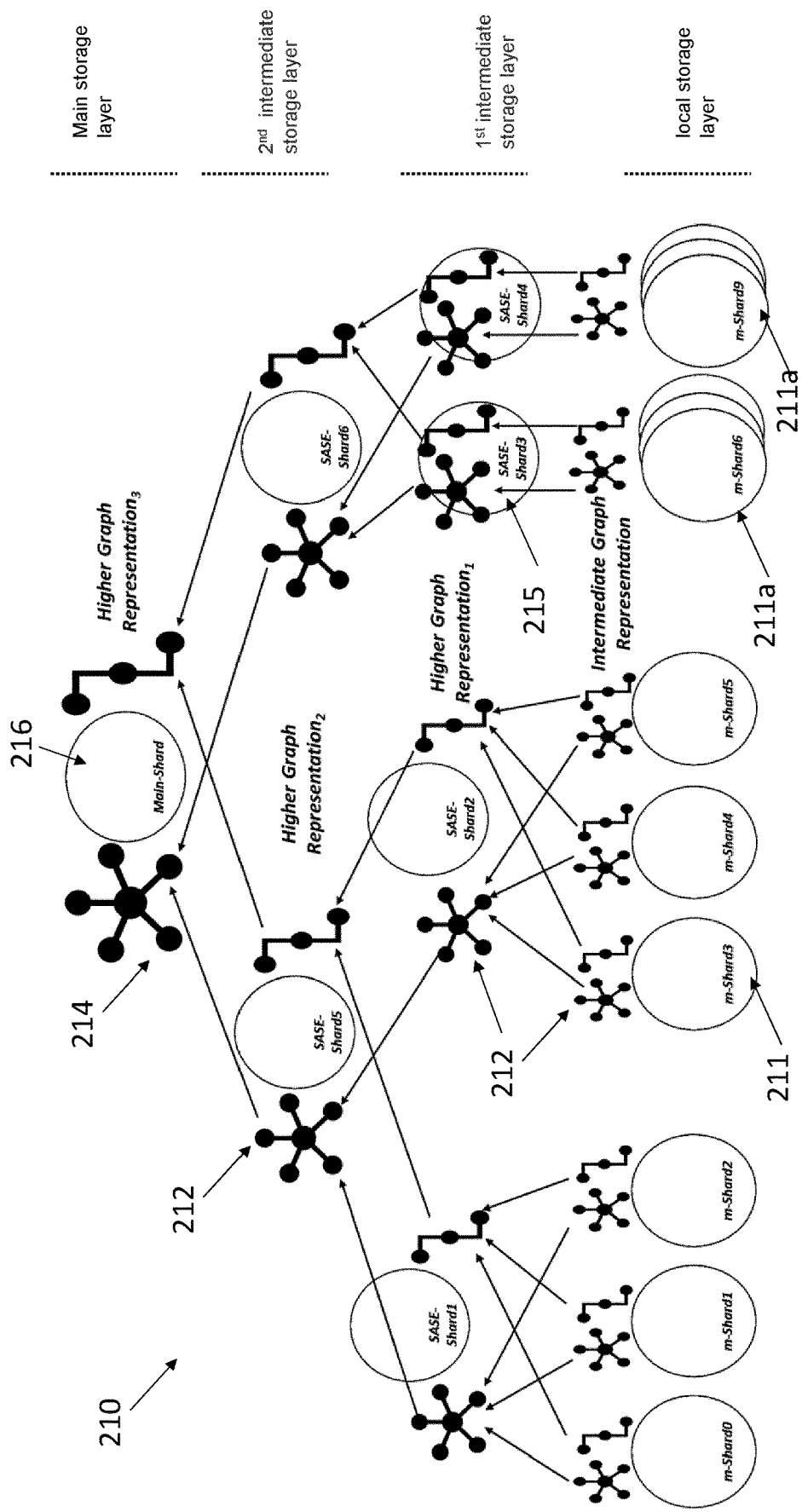
FIG. 4 shows an example of the hierarchical storage layers in the consensus ordering module according to embodiments of the present invention.

An example of a partitioned DLT storage architecture into different hierarchical storage layers is shown in FIG. 4. As shown, the DO module 110, based on the data collected from the sensor monitoring module 130, adjusted the DLT storage architecture of the DLT storage module 210 so that it includes a local storage layer, two intermediate storage layers, and a main storage layer. The local storage layers comprising a number of m-shards 211, which represent the DLT shards 211 of the target DLT platform 200. As shown, the DO module 110 may also generate m-shard groups 211a, comprising a plurality of m-shards 211 having common characteristics, as previously disclosed. Each m-shard 211 or m-shard group 211a may be associated with a local network 212 comprising a set of local transaction processing nodes, which are configured to process and verify transaction submitted to each of the m-shards 211 or m-shard groups 211a. In general, each m-Shard represent localized DLT shards 211 of a DLT platform that includes a plurality of transaction processing nodes, also referred to as Local Committee Members (LCM), that process and store transactions. m-Shards belong to the lowest hierarchy level in SASE's architecture. Each m-Shard is maintained by a set of LCM nodes 212 that run a consensus protocol defined by GCR 220 to process transactions. The DLT transactions processed by the LCM networks 212 of the m-shards are provided as input to the IGR module 115 where they are converted in an IGR data structure. The generated IGR data structures are provided as input to the HGR module 113 to generate the corresponding HGR data structures containing the references to the DLT transactions stored in the m-shards 211 of the local storage layer. The generated HGR data structures are stored in a number of SASE shards 215, defined by the DO module 110, of the first intermediate layer. The DO module 110 may decide that the HGR data structures of the first intermediate storage layer may be further abstracted to a higher-level HGR data structures that are to be stored in SASE shards of a second intermediate storage layer of higher hierarchy. The generated HGR data structures contain references to IGR and/or HGR data structures of lower hierarchy. The HGR data structures of the second intermediate storage layer may be aggregated and abstracted to a higher level HGR data structure, which is stored in the main shard 216 of the main storage layer. The addition of the one or more intermediate layers is not essential but rather is determined by the data collected by the sensor monitoring module 130. The main shard 216 is associated with a set of GCM nodes 214 configured to verify and process transactions referenced in the HGR data structured stored in the main shard 216.

In general, the main-shard 215 represents the shard in the highest hierarchical level, that includes a plurality of GCM nodes that run the consensus protocol defined in the GCR module 220. GCM nodes of the main shard are selected from LCM nodes of shards in the system by the GCS module 114. The main-shard 216 may also have additional nodes that are selected by GCS 114 in order to ensure safety and liveliness of the consensus protocol. The main shard's nodes submit processed transactions to HGR module and persists a $HGR_x$ formed data, which has the highest hierarchical level, that includes references to transactions in $HGR_x$, or IGR data structures stored in shards of lower hierarchical levels. As such, the main-shard 216 provides a global consensus and ordering of all transactions processed in the system, its data has the highest abstraction level (i.e. $HGR_x$ where x is the biggest abstraction index number in the overall system) and HGR modules ensures correct ordering of the transactions aggregated in the $HGR_x$ form.

In general, a SASE-shard 215 represents shard of a DLT that includes the plurality of the LCM and GCM nodes processing transactions according to the consensus protocol defined in the GCR module 220. SASE-shards 215 may be automatically generated by a shard formatting (SF) 111 module according to the decision of the DO module with regards to system requirements i.e. system's self-state and operational environment data collected by Sensors module, thus, SASE-shards represent autonomous shard generation property of SASE. SASE shards 215 can be generated in various hierarchical levels below the Main-shard that is decided by the DO module. SASE-shards' LCM and GCM nodes submit processed transactions to HGR module and persists a $HGR_x$ formed data, that has references to transactions of shards that have lower hierarchy level (i.e. m-shards with IGR or SASE-shards in lower hierarchy $HGR_{x-n}$ where n is in range of 1 to x).

The shard formatter module 111 may be configured to execute the instructions of the selected configuration protocols and perform required network and data layer operations associated with the DLT configuration changes made by the selected configuration protocol. The shard formatter module comprises a network layer module configured to set up an overlay network for assigning identities and keys to the transaction processing nodes and managing connections between transaction processing nodes based on a membership management protocol. It should be noted that the type of membership management protocol may vary depending on the target DLT. The shard formatter module 111 may further comprise a data layer module configured to migrate data and current states of shards in the DLT storage module to each transaction processing node participating in a corresponding transaction processing network. In general, the SF module 111, may be provided with libraries and algorithms associated with the instantiation, generation, and restructuring of shards according to the shard configuration dictionary input by DO module.

Operations performed by the SF module may involve:
- network layer operations: the SF module, through set of algorithms and protocols, assigns identities and keys to set up an overlay network, through various operations, such as; setting up a public key infrastructure (PKI) by assigning identities and keys to nodes, introducing nodes to each other with a membership management protocol etc.
- data layer operations: SF module, through set of algorithms and protocols, performs data and state migration operations. As such, depending on the consensus protocol defined in GCR module 220, SF module migrates the current state and recorded data (e.g. transactions etc.) of a shard to nodes (i.e. LCM or GCM) that will be participating in that shard.

Figure 5:
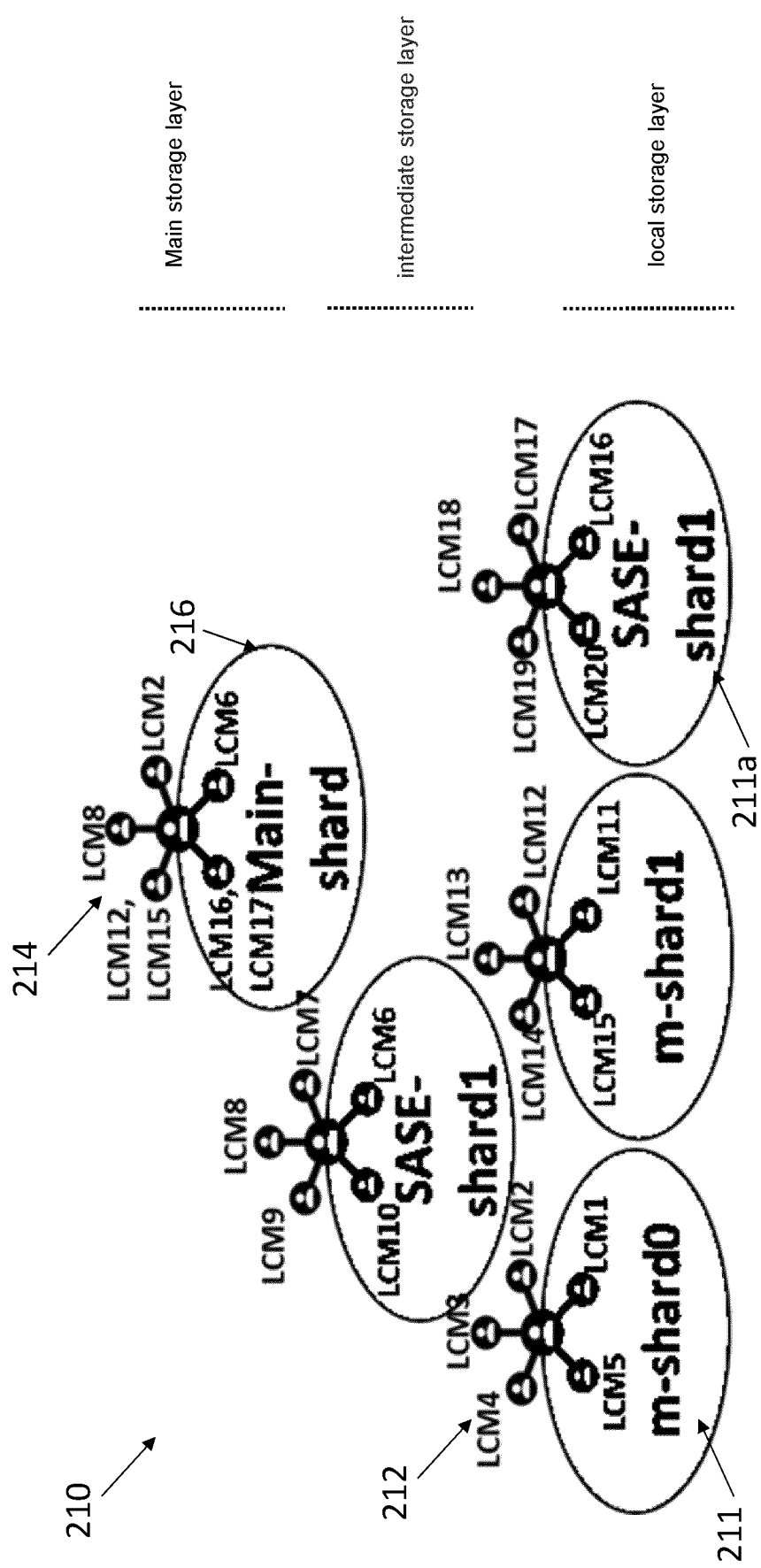
FIG. 5 shows an example of a sharding engine according to embodiments of the present invention.
Figure 6:
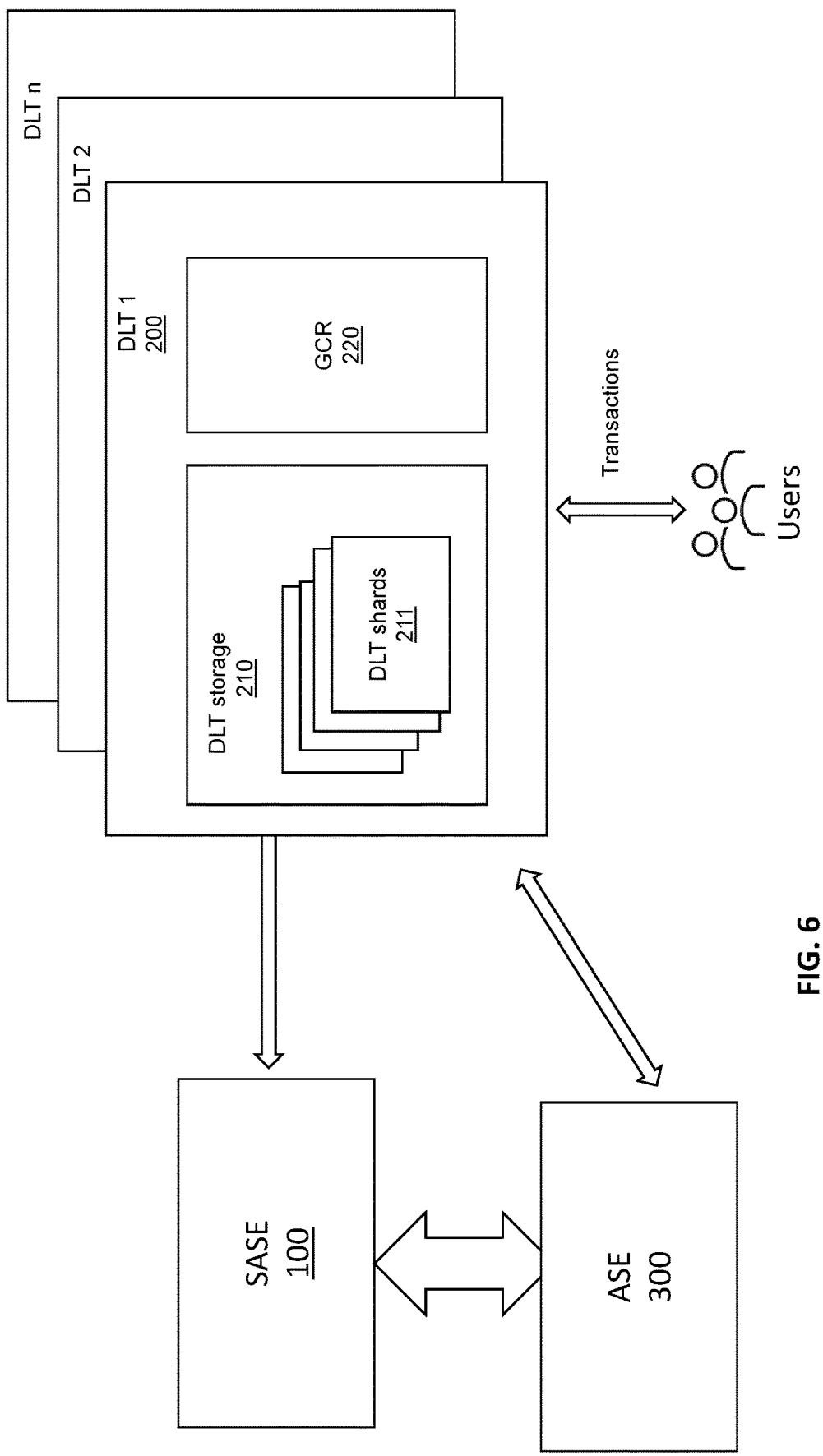
FIG. 6 shows an example of a sharding engine in connection with an Atomic Swap Engine (ASE) according to embodiments of the present invention.

Another example of a partition of the DLT storage architecture is shown in FIG. 5, where the DO module 110 generated a SASE shard in the local storage layer. Furthermore, it is shown the selection of GCM 214 from LCM nodes 212 assigned to shards, m-shards or SASE shards, in the local and intermediate storage layers.

In general, an LCM is a node that takes part in the consensus process of m-shards by validating transactions and performing state changes. In SASE 100, an LCM belongs to one or more m-shards or SASE shards. LCM nodes that are selected by the GCS module 114 and the DO module 110 are assigned to a shard to process transactions submitted to that shard through the consensus protocol of the target DLT.

In general, the GCM node is an LCM node that is selected by the GCS module to take part in the consensus process of the Main Shard and SASE shards by validating transactions and performing state changes. GCM nodes run the consensus protocol of the target DLT defined in the GCR module. GCM nodes are evaluated by GCS module with regards to their operation, and GCS module periodically changes GCM nodes.

The SASE 100 may be provided with a reward/penalty, RP, module 170 configured for assessing, based on the generated performance metrics, the performance of the local transaction processing nodes associated with each DLT shard of the DLT platform and accordingly assign to each transaction processing node a performance score indicative of their liveness and safety. The DO module may be configured to adjust and optimise the network of transaction processing nodes associated with each shard of the DLT storage based on their performance score. In general, the RP module 170 may comprise libraries for instantiating rewards and penalties to LCMs and GCMs. The DO module 110 inputs a reward/penalty dictionary that consists of rewards and penalties for set of LCM and GCM nodes. The RP module assigns rewards and penalties to the LCM and GCM nodes according to their malicious and honest behaviour. The DO module may be configured to adjust and optimise the network of transaction processing nodes by removing or replacing underperforming transaction processing nodes, and/or assigning and/or redistributing transaction processing nodes according to the partition configuration of the DLT platform 200.

The SASE 100 may be provided with a Cross-shard Collaboration, CC, module 160 configured to execute and validate inter-shard transactions involving a plurality of shards. The CC module 160 is configured to select a communication protocol for transmitting transactions, states, cryptographic signatures and state transfers between shards, and a validation protocol configured to validate inter-shard transactions according to the current state of the shards involved and the local and/or global consensus protocol. The CC module 160 is communicatively coupled to a Correct Data Provider, CDP, module 150 of the sharding engine to validate inter-shard transactions, wherein the CDP module 150 is configured to connect to the transaction processing nodes of the networks associated with each shard in the DLT storage module 210 to retrieve and validate, based on a set of validation procedures, the outputs and actions taken by the corresponding transaction processing nodes participating in the inter-shard transactions. For example, the validation procedures may comprise at least one of validating DLT states provided by the transaction processing nodes of the global network through succinct proofs generated by means of cryptographic tools of a Cryptographic module 180, and detecting inconsistencies in the states provided by the local and global transaction processing nodes generated based on an expected state evolution, verify state agreement between shards involved in inter-shard transactions.

In general, the CC module 160 provides functionalities to safely execute inter-shard transactions e.g. atomic swaps, asset transfers etc. on plurality of shards. The CC module 160 may be provided with a set of libraries such as:
- communication libraries: to connect shards to each other by providing data exchange and communication layer for transmitting transactions, states, cryptographic signatures and state transfers etc.
- validation libraries: to check validity of the transactions according to shards' state and consensus algorithm, The CC module connects to all shards in SASE to transmit states and transactions across shards. It also co-operates with CDP module 150 in order to verify correctness of the inter-shard transactions, where CDP module 150 performs state validity checks, state evolution verification etc. CC module 160 transmits validated states and transactions to respective shards.

In general, the CDP module 150 validates outputs and actions of GCM and LCM nodes. Such actions and outputs may include transactions and states processed and transmitted by GCM and LCM nodes to other nodes and parties in SASE 100. The CDP module may be connected to the different modules in the SASE 100 as follows:
- GCM and LCM nodes of all shards for data validation,
- GCR module 220 for inputs on rules and characteristics of consensus protocol,
- Cryptographic module for accessing cryptographic operations toolbox.
- CC module for providing state verification, state agreement, and state inconsistency checks for inter-shard operations The CDP module may comprise a suite of procedures, which include but not limited to:
- validity proofs of states provided by GCMs through succinct proofs of knowledge utilizing cryptographic tools in the Cryptographic module,
- fraud proofs of inconsistencies in the states given by GCMs to LCMs by guaranteeing data integrity with techniques that provide proofs of state evolution,
- probabilistic sampling methodologies for state agreement verification of shards to the CC module, provided by the Cryptographic module,
- protocols for data availability proofs, provided by the Cryptographic module.

The cryptographic module 180 may be provided with a set of cryptographic procedures, schemes and protocols. Functionalities performed by the CM 180 may include but are not limited to:

Data confidentiality: encryption schemes transform confidential input data in an encrypted format such that only authorized parties can access the confidential data.

Data anonymization: anonymization procedures operate on input data to ensure that such data can no longer be attributed to a given subject.

Data authentication: signature schemes produce digital attestations that a given piece of data has been originated from the intended subject. This includes the authenticated version of the most relevant data structures.

Data integrity: integrity schemes guarantee that a given piece of data has been not tampered with.

Advanced functionalities: several operations like advanced signature schemes or privacy-preserving computations over encrypted data require the deployment of techniques including but not limited to zero knowledge proofs, (ZKPs), secure multi-party computation protocols (MPC) etc.

According to embodiments of the present disclosure, the DO module 110 enables the SASE 110 to be self-adaptive by enabling autonomous dynamic self-aware e.g. restructuring of shards and context-aware e.g. generation of new shards sharding adjustments. The DO module 110 may dynamically update the architecture of the target DLT by transferring dictionaries that instruct other modules to configure autonomous and self-adaptive sharding. It also may ensure the maintenance of target security and performance level of the shards. In general, the DO module 110 may receive inputs from:

the Sensors module for self-aware data of the shards' self-states (see Sensors module), the Sensors module for context-aware data related of shards' operational environment (see Sensors module for the list of context-aware input data submitted to DO module).

The DO module 110 may output data to:

the SF module a "shard configuration dictionary" that consists of new shard configurations the RP module a "reward/penalty dictionary" that consists of rewards and penalties for LCM and GCM nodes In general, the DO module 110 may be provided with a set of libraries, such as:

analytics libraries: to correlate and convert self-aware and context-aware input by the Sensors module to statistics and dictionary patterns optimization and decision libraries: to optimize the performance of selected group of nodes and to decide on the reconfiguration and generation of new shards.

incentives libraries: to design incentive and penalty schemes to generate reward/penalty dictionaries.

The DO module 110 functionalities, may be classified, but not limited to the following categories and related protocols:

Sharding reconfiguration protocol: a protocol to trigger the reconfiguration of shards due to low performance, malicious and unresponsive nodes of shards, consensus and network status of the shards etc. The protocol acts by adding more nodes to the shards, removing malicious/unresponsive nodes from the system, selecting set of LCM and GCM members for re-configured shards through optimized node selection and valid node selection workflows.

Shard generation protocol: a protocol to generate a new m-Shard or SASE-shard due to low performance, increased transaction requests etc. The protocol acts by identifying shard as m-Shard or SASE shard, selecting hierarchical level and position (i.e. to which shards it consists references to) of the shard if the shard type is a SASE shard, selecting set of LCM and/or GCM members for re-configured shards through optimized node selection and valid node selection.

Rewards/Penalties distribution protocol: a protocol to implement reward and penalty schemes for rewarding or penalising identifying the behaviour of LCM and GCM nodes, consistently with the consensus protocol defined in the GCR. The protocol acts by creating reward/penalty dictionaries for LCM and GCM operations.

Proper node selection: a protocol to select nodes and nodes' sets, in collaboration with the GCS module, that can satisfy safety and liveliness requirements of the consensus algorithm defined in the GCR module 220. The protocol acts by:

deriving safety and liveness requirements from the GCS and verifying the same requirements for nodes or set of nodes optimizing the node selection process with the optimization and decision libraries and output the appropriate dictionary.

An exemplified process flow for dynamic sharding of a target DLT platform 200 may include the following steps:

Step 1: Initial sharding configuration of the target DLT platform 200 is defined by system admin's inputs.

Step 2: Self-adaptive sharding engine, SASE, 100 is connected to the target DLT platform 200 in its initial configuration of the sharding.

Step 3: Sensors module 130 connects to all shards and LCM and GCM members defined in the initial shard configuration and monitors and collects data that reflect state of all and overall SASE's 100 operational environment. Sensor module 130 feeds collected data to DO module.

Step 4: DO module 110 processes input data through its analytics libraries to convert data into target platform's execution statistics and dictionaries.

Step 5: DO module 110 processes data related to LCM and GCM nodes' execution, in order to classify nodes' execution status (i.e. active or non-responsive) and behaviour (i.e. honest or malicious with regards to consensus protocol of the target DLT platform as defined in the GCR module 220).

Step 6: DO module 110, through its incentive libraries, in pre-identified time intervals, assigns rewards and penalties to LCM and GCM nodes with respect to their execution status and behaviour by populating the "reward and penalty dictionary". DO module sends the reward and penalty dictionary to the RP module 170.

Step 7: DO module 110 processes the DLT platform's 200 execution statistics and dictionary patterns through running its decision and optimization libraries and identifies whether reconfiguration of existing shards or generation of new shards is necessary.

Step 8: If DO module 110 decides to generate a new shard or reconfigure an existing shard, it operates as follows:

Identifies the type of shard: m-Shard 211 or SASE shard 215,

Selects new shard's hierarchical level and position and identifies its data structures schema (by setting up references to hierarchically upper and/or lower level shards)

Selects a set of candidate LCM nodes according to various parameters for performance optimization by treating this process as a multi-objective optimization problem. For this optimization problem, DO module considers many parameters and dimensions including but not limited to:
- functionality of the nodes, where DO modules 110 aims to group nodes that target executing similar set of transactions in order to decrease amount of inter-shard transactions,
- past activity of nodes (e.g. if a node has acted maliciously or has always followed the consensus protocol etc.),
- activity status of nodes (e.g. if node is running actively or is it unresponsive),
- geographical proximity of nodes (i.e. in order to optimize selection to nodes that have smaller data transmission latency among each other),
- network capabilities of nodes (e.g. input output bandwidths).

Step 9: DO module 110 sends information on selected candidate LCM nodes to GCS module.

Step 10: GCS module 114 checks validity of the set of candidate LCM nodes with respect to their capability to satisfy safety and liveliness requirements of the consensus algorithm of the DLT defined in GCR module 220. GCS module 114 sends "not suitable" message to DO module if candidate set of LCM nodes are not able to satisfy requirements of the consensus protocol.

If GCS module 114 finds set of candidate LCM nodes suitable, it then selects some GCM nodes from that set, and sends the "suitable" message along with the list of GCM nodes to the DO module.

If DO module 110 receives "suitable" message along with GCM nodes list, it populates the shard configuration dictionary. However, if DO module 110 receives "not suitable" message, then re-selects set of candidate LCM nodes by going back to Step 8.

Step 11: DO module 110 sends shard configuration dictionary to the SF module.

Step 12: SF module 111 instantiates newly formatted shard according to the shard configuration dictionary input by DO module by performing necessary network layer and data layer operations.

In general, the SASE 100 presented herein, unlike existing platforms, is an autonomous, self-aware and context-aware self-adaptive system for performing automatic sharding on DLTs independently of platform-specific properties such as underlying data structures, security properties and consensus protocols.

In general, the SASE 100 presented herein, enables a number of selected nodes from all or some shards to participate in the processing of inter-shard transactions processed by the DLT platform 200. This enables a global system level decentralized consensus protocol.

In general, the SASE 100 presented herein, is modular with a 3-layer system abstraction: m-Shards, SASE-Shards, and Main Shard. Each system's layer may access system level algorithms grouped in modules. The composition of those algorithms enables parameter driven self-adaptive sharding and coordinates global inter-shard operations with global ordering via consensus of the operations (e.g. events, transactions).

In general, the SASE 100 presented herein, enables for the reconfiguration of the DLT storage 210 by introducing two data structures:
- the Intermediate Graph Representation (IGR), which is a graph data structure and/or a linked data structure e.g. linked list, queue, blockchain as cryptographically linked records etc. that is configured to abstract the data structure of the target DLT data e.g. blockchain, DAG in a common data representation form;
- the Higher Graph Representation (HGR) data structure that is the aggregation of a plurality of IGR and/or lower hierarchical level HGR data structures.

In general, the IGR and HGR data structures enable abstraction of the data structures associated with target DLTs in a common representation format. As such the SASE 100 of the present disclosure is platform agnostic and may be used to dynamically reconfigure various DLT platforms irrespective of their underlying data structure.

In general, the SASE 100 presented herein, enables the execution of the inter-shard transactions, while ensuring confidentiality and privacy of the transactions processed in the shards through the composition of advanced cryptographic techniques coded in a cryptographic toolbox, such as Zero Knowledge Proofs (ZKPs), Secure Multi-Party Computation (SMPC) protocols, and other advanced cryptographic algorithms.

In general, the SASE 100 presented herein, ensures self-aware e.g. restructuring of shards, and context-aware e.g. generation of new shards, sharding adjustments through the algorithms of a Decision and Optimization module. As such, the SASE 100 presented herein enables autonomous dynamic updates to the target DLT through sharding adjustments.

The invention claimed is:

1. A method comprising:
    storing and processing, by a distributed ledger technology (DLT) platform comprising a DLT storage, DLT transactions, the DLT storage being partitioned into one or more DLT shards according to a DLT configuration, each DLT shard being associated with a local network of transaction processing nodes configured to process and verify submitted DLT transactions according to a local consensus protocol defined by a Global Conflict Resolver (GCR) algorithm and library in accordance with the DLT configuration; and
    monitoring and optimizing, by a sharding engine (SE) software communicatively coupled to the DLT platform, performance of the communicatively coupled DLT platform,
    the monitoring and optimizing comprising:
        monitoring, by a sensor, a set of configuration parameters associated with the DLT platform;
        receiving and processing, by a decision and optimisation (DO) software, values obtained from the set of configuration parameters to determine a set of corresponding performance metrics indicative of operational performance of a target DLT platform; and
        triggering, by the DO software executing instructions of at least one configuration protocol of a configuration protocol database, an optimisation of one or more aspects of the DLT configuration;
        comparing, by the DO software, values of the performance metrics with corresponding target values;
        determining that at least one of the performance metrics is within a value range from at least one corresponding target value; and
        adjusting, by the DO software, an aspect of the DLT configuration of the DLT platform to optimise its operational performance.

2. The method of claim 1, comprising:
adjusting, by the DO software, the DLT configuration based on at least one configuration protocol selected from the configuration protocol database.

3. The system method of claim 1, comprising:
selecting the at least one configuration protocol, based on the operational performance determined for the DLT platform, from a DLT optimisation matrix comprising a plurality of different DLT operational performance scenarios, each associated with one or more configuration protocols from the configuration protocol database.

4. The method of claim 3, comprising:
when the determined DLT operational performance is absent from the DLT optimisation matrix, issuing, by the DO software, a notification to one or more users indicating at least one of a request for input for adjusting the DLT configuration or a selection of a configuration protocol.

5. The method of claim 2, comprising:
adjusting by, the DO software, based on the at least one configuration protocol selected, a DLT storage architecture.

6. The method of claim 5, wherein adjusting the DLT storage architecture comprises adjusting a partitioning configuration of the DLT storage architecture by adjusting a number and a structure of DLT shards involved in the processing of DLT transactions.

7. The method of claim 5, wherein adjusting the DLT storage architecture comprises grouping of DLT shards having common shard characteristics.

8. The method of claim 7, wherein the common shard characteristics comprise identifying DLT shards that are involved in inter-shard DLT transactions.

9. The method of claim 5, comprising:
adjusting, by the DO software, based on the selected at least one configuration protocol, the DLT storage architecture by splitting the DLT storage architecture into a plurality of hierarchically connected storage layers.

10. The method of claim 9, wherein the plurality of hierarchically connected storage layers comprise a local storage layer, which is configured to store in a plurality of local shards the DLT transactions submitted to each of the one or more DLT shards, and a main storage layer comprising one main shard, which is configured to store references to all DLT transactions processed by shards belonging to lower storage layers.

11. The method of claim 10, wherein the plurality of hierarchically connected storage layers comprise one or more intermediate storage layers between the local storage layer and the main storage layer, each intermediate storage layer being configured to store, in intermediate shards, inter-shard DLT transactions between two or more DLT shards or references to transactions processed by a group of shards belonging to the local storage layer or one or more lower hierarchy intermediate storage layers.

12. The method of claim 9, wherein each shard in each of the plurality of hierarchically connected storage layers is associated with a network of transaction processing nodes for ordering and verifying submitted DLT transactions.

13. The method of claim 12, comprising:
selecting, by a Global Committee Selection (GCS) software of the DO software, based on a set of criteria associated with safety and liveness, a set of global transaction processing nodes from local networks of the one or more DLT shards to participate in the network of transaction processing nodes associated with the shards in each hierarchically connected storage layer.

14. The method of claim 13, comprising:
generating, by the GCS software, a global network of transaction processing nodes for processing and verifying transactions submitted to the main shard of the main storage layer and intermediate shards of the intermediate storage layers, wherein the global network of transaction processing nodes are at least selected from the transaction processing nodes of the local network associated with each of the DLT shards.

15. The method of claim 9, comprising:
generating, by the DO software, shards at each different hierarchically connected storage layers, based on the DLT transactions submitted to at least one of the one or more DLT shards or a grouping of the one or more DLT shards.

16. The method of claim 10, comprising:
converting, by an Intermediate Graph Representation (IGR) software of the DO software, a data structure of DLT transaction data processed by the local network of transaction processing nodes in each of the local shards of the local storage layer into a common IGR data structure, which acts as a common data representation format for various types of DLT platforms.

17. The method of claim 16, wherein the common IGR data structure comprises a graph data structure configured to abstract a data structure of a target DLT platform to the common IGR data structure; and
an authenticated data structure comprising ordered references to transactions in the graph data structure, so that operations submitted to the DLT platform by untrusted parties are verified by corresponding networks of transaction processing nodes.

18. The method of claim 16, wherein a DLT consensus software comprises a Higher Graph Representation (HGR) software configured to receive as input the common IGR data structure generated by the IGR software and accordingly convert them into corresponding higher graph representations (HGR) data structures stored at corresponding intermediate shards in at least one of: one or more intermediate storage layers or the main shard of the main storage layer of the DLT storage.

19. The method of claim 18, wherein each HGR data structure comprises references to inter-related DLT transactions referenced in at least one of a plurality of IGR or the HGR data structures that are stored at a lower hierarchical storage layer of the DLT storage.

20. The method of claim 18 comprising the sharding engine software of claim 18, wherein the HGR software comprises a graph data structure configured to aggregate multiple graph data structures into a single graph data structure, such that a DLT transaction stored in an HGR graph data structure consists of references to DLT transactions referenced in at least one of the IGR or lower level HGR data structures; and
an authenticated data structure comprises ordered references to transactions in the HGR graph data structure so as to ensure correct ordering of the references to transactions and provide a mapping between HGR and IGR referenced DLT transactions.

21. The method of claim 1, wherein the sharding engine software comprises a Reward-Penalty (RP) software configured for assessing, based on generated performance metrics, the performance of local transaction processing nodes associated with each DLT shard of the DLT platform and accordingly assign to each local transaction processing node a performance score indicative of liveness and safety.

22. The method of claim 21, comprising:
adjusting and optimizing, by the DO software, the local network of transaction processing nodes associated with each shard of the DLT storage based on their performance score.

23. The method of claim 22, wherein adjusting and optimising the network of transaction processing nodes comprises at least one of: removing underperforming transaction processing nodes, replacing underperforming transaction processing nodes, assigning transaction processing nodes according to a partition configuration of the DLT platform, or redistributing transaction processing nodes according to the partition configuration of the DLT platform.

24. The method of claim 21, comprising:
executing, by a shard formatter software of the DO software, instructions of a selected configuration protocol and perform required network and data layer operations associated with DLT configuration changes made by the selected configuration protocol.

25. The method of claim 24, comprising:
setting up, by a network layer software of the shard formatter software, an overlay network for assigning identities and keys to the local transaction processing nodes and managing connections between the local transaction processing nodes based on a membership management protocol.

26. The method of claim 24, comprising:
migrating, by a data layer software of the shard formatter software, data and current states of shards in the DLT storage to each local transaction processing node participating in a corresponding local network of transaction processing nodes.

27. The method of claim 1, comprising:
executing and validating, by a Cross-shard Collaboration (CC) software of the sharding engine software, inter-shard transactions involving a plurality of shards.

28. The method of claim 27, comprising:
selecting, by the CC software, a communication protocol for transmitting transactions, states, cryptographic signatures and state transfers between shards, and a validation protocol configured to validate inter-shard transactions according to a current state of the shards involved and at least one of the local or global consensus protocol.

29. The method of claim 27,
wherein the CC software is communicatively coupled to a Correct Data Provider (CDP) software of the sharding engine software to validate inter-shard transactions,
wherein the CDP software is configured to connect to local transaction processing nodes of the local network of transaction processing nodes associated with each shard in the DLT storage to retrieve and validate, based on a set of validation procedures, outputs and actions taken by local transaction processing nodes participating in the inter-shard transactions.

30. The method of claim 29, wherein the set of validation procedures comprises at least one of: validating DLT states provided by local transaction processing nodes of a global network through succinct proofs generated by means of cryptographic tools of a Cryptographic software, detecting inconsistencies in the DLT states provided by the local transaction processing nodes by comparing generated responses with an expected state evolution, and verify state agreement between shards involved in inter-shard transactions.

31. A method for monitoring and optimising performance of distributed ledger technology (DLT) platforms, the method comprising:
monitoring a set of configuration parameters associated with a DLT configuration of a DLT platform;
receiving and processing values obtained from the set of configuration parameters to determine a set of corresponding performance metrics indicative of operational performance of a target DLT platform; and
comparing the values of the set of corresponding performance metrics with corresponding target values,
wherein the DLT platform includes a DLT storage for storing and processing DLT transactions, the DLT storage being partitioned into one or more DLT shards according to the DLT configuration, each DLT shard being associated with a local network of transaction processing nodes for processing and verifying submitted DLT transactions according to a local consensus protocol defined by a Global Conflict Resolver (GCR) algorithm and library in accordance with the DLT configuration, and
wherein, when at least one of the performance metrics is within a value range from at least one corresponding target value, a Decision and Optimization (DO) software adjusts an aspect of the DLT configuration of the DLT platform to optimise the operational performance of the DLT platform.

\* \* \* \* \*